United States Patent
Shuck

(10) Patent No.: US 10,987,857 B2
(45) Date of Patent: Apr. 27, 2021

(54) ADDITIVELY MANUFACTURED POLYMERIC COMPONENTS

(71) Applicant: Rolls-Royce Corporation, Indianapolis, IN (US)

(72) Inventor: Quinlan Yee Shuck, Indianapolis, IN (US)

(73) Assignee: Rolls-Royce Corporation, Indianapolis, IN (US)

( * ) Notice: Subject to any disclaimer, the term of this patent is extended or adjusted under 35 U.S.C. 154(b) by 367 days.

(21) Appl. No.: 15/978,791

(22) Filed: May 14, 2018

(65) Prior Publication Data
US 2019/0344495 A1  Nov. 14, 2019

(51) Int. Cl.
| | |
|---|---|
| B29C 64/118 | (2017.01) |
| B29C 64/393 | (2017.01) |
| B29C 64/295 | (2017.01) |
| B29C 64/209 | (2017.01) |
| B29C 64/245 | (2017.01) |
| B33Y 30/00 | (2015.01) |
| B33Y 50/02 | (2015.01) |
| B33Y 10/00 | (2015.01) |
| B33Y 70/00 | (2020.01) |

(52) U.S. Cl.
CPC .......... B29C 64/118 (2017.08); B29C 64/209 (2017.08); B29C 64/245 (2017.08); B29C 64/295 (2017.08); B29C 64/393 (2017.08); B33Y 10/00 (2014.12); B33Y 30/00 (2014.12); B33Y 50/02 (2014.12); *B29K 2995/0005* (2013.01); *B29K 2995/0096* (2013.01); *B33Y 70/00* (2014.12)

(58) Field of Classification Search
CPC .......................... B29C 64/118; B29C 64/124
See application file for complete search history.

(56) References Cited

U.S. PATENT DOCUMENTS

| | | | |
|---|---|---|---|
| 9,527,242 B2 | 12/2016 | Rodgers et al. | |
| 9,925,714 B2 | 3/2018 | Rodgers et al. | |
| 2015/0014885 A1* | 1/2015 | Hofmann | B29C 64/106 264/294 |
| 2017/0052531 A1* | 2/2017 | Minardi | B29C 64/393 |
| 2017/0259497 A1 | 9/2017 | Prestayko et al. | |
| 2018/0297272 A1* | 10/2018 | Preston | B29C 64/106 |

FOREIGN PATENT DOCUMENTS

WO    2016108154 A1    7/2016

* cited by examiner

*Primary Examiner* — Matthew J Daniels
*Assistant Examiner* — Andrew L Swanson
(74) *Attorney, Agent, or Firm* — Shumaker & Sieffert, P.A.

(57) ABSTRACT

An example technique may include depositing, on or adjacent a substrate, a first volume of a polymeric material using an additive manufacturing technique. The first volume of the polymeric material has a first degree of polymer orientation associated with a first deposition rate and a first temperature. The example technique may include depositing, on or adjacent the substrate or the first volume of material, at least one second volume of the polymeric material. The second volume of the polymeric material has a second degree of polymer orientation associated with a second deposition rate and a second temperature. The first volume and the second volume are configured to respond to a shape change stimulus by exhibiting a respective first change in dimension and a second change in dimension. The first change in dimension is different from the second change in dimension by a predetermined threshold.

11 Claims, 3 Drawing Sheets

40

HIGHER ORIENTATION
42

HIGH PRINT SPEED/
LOWER TEMPERATURE

LOWER ORIENTATION
44

LOW PRINT SPEED/
HIGHER TEMPERATURE

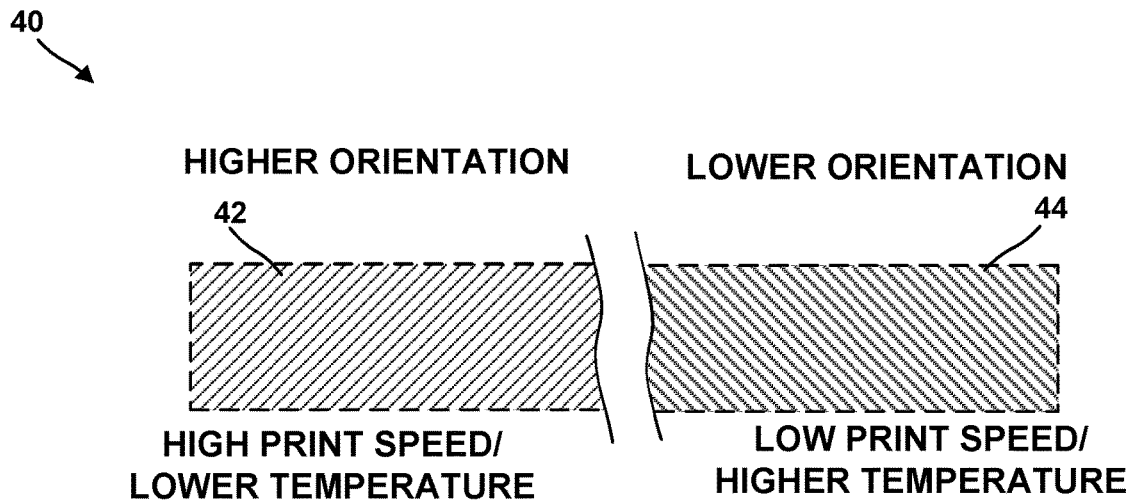
FIG. 2
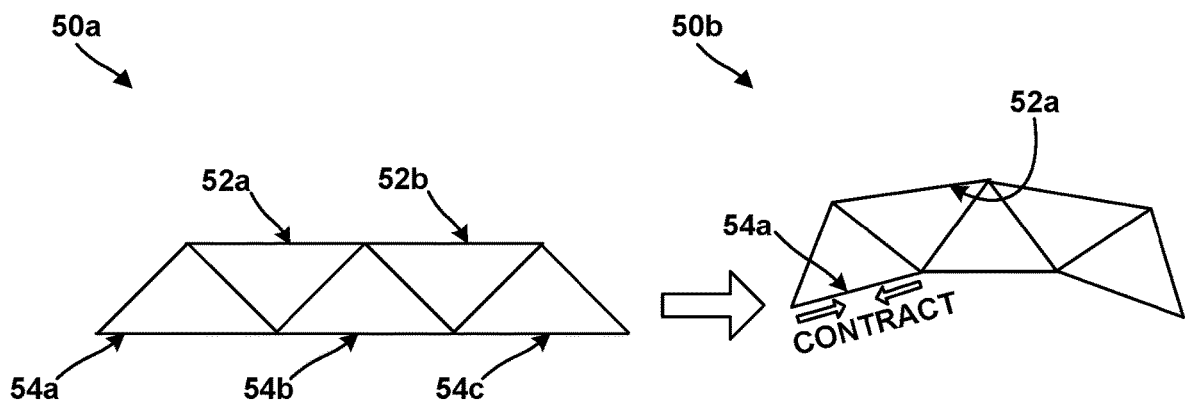
FIG. 3A
FIG. 3B

US 10,987,857 B2

ADDITIVELY MANUFACTURED POLYMERIC COMPONENTS

TECHNICAL FIELD

The disclosure relates to additive manufacturing techniques, in particular, to additive manufacturing of polymers.

BACKGROUND

Additive manufacturing generates three-dimensional structures through addition of material layer-by-layer or volume-by-volume to form the structure, rather than removing material from an existing volume to generate the three-dimensional structure. Additive manufacturing may be advantageous in many situations, such as rapid prototyping, forming components with complex three-dimensional structures, or the like. In some examples, additive manufacturing may include fused deposition modeling, in which heated material, such as polymer, is extruded from a nozzle and cools to be added to the structure, or stereolithography, in which an energy source is used to selectively cure a liquid photopolymer resin to a desired shape of the component.

SUMMARY

In some examples, the disclosure describes a technique that includes depositing, on or adjacent a substrate, a first volume of a polymeric material at a first deposition rate and a first temperature using an additive manufacturing technique for depositing volumes of the polymeric material. The first volume of the polymeric material has a first degree of polymer orientation associated with the first deposition rate and the first temperature. The example technique may include depositing, on or adjacent the substrate or the first volume of material, at least one second volume of the polymeric material at a second deposition rate and a second temperature. The second volume of the polymeric material has a second degree of polymer orientation associated with the second deposition rate and the second temperature. The first volume and the second volume are configured to respond to a shape change stimulus by exhibiting a respective first change in dimension and a second change in dimension. The first change in dimension is different from the second change in dimension by a predetermined threshold.

In some examples, the disclosure describes an additive manufacturing system that includes a substrate defining a major surface, means for additively depositing volumes of a material using an additive manufacturing technique, and a computing device. The computing device is configured to control the means for additively depositing volumes to deposit on or adjacent the substrate a first volume of a polymeric material at a first deposition rate and a first temperature. The first volume of the polymeric material has a first degree of polymer orientation associated with the first deposition rate and the first temperature. The computing device is configured to control the means for additively depositing volumes to deposit, on or adjacent the substrate or the first volume of material, at least one second volume of the polymeric material at a second deposition rate and a second temperature. The second volume of the polymeric material has a second degree of polymer orientation associated with the second deposition rate and the second temperature. The first volume and the second volume are configured to respond to a shape change stimulus by exhibiting a respective first change in dimension and a second change in dimension. The first change in dimension is different from the second change in dimension by a predetermined threshold.

In some examples, the disclosure describes a non-transitory computer-readable storage device. The storage device includes instructions that, when executed, cause one or more processors of a computing device to control means for additively depositing volumes to deposit, on or adjacent a substrate, a first volume of a polymeric material at a first deposition rate and a first temperature using an additive manufacturing technique for forming volumes of the polymeric material. The first volume of the polymeric material has a first degree of polymer orientation associated with the first deposition rate and the first temperature. The storage device includes instructions that, when executed, cause one or more processors of a computing device to control the means for additively depositing volumes to deposit, on or adjacent the substrate or the first volume of material, at least one second volume of the polymeric material at a second deposition rate and a second temperature. The second volume of the polymeric material has a second degree of polymer orientation associated with the second deposition rate and the second temperature. The first volume and the second volume are configured to respond to a shape change stimulus by exhibiting a respective first change in dimension and a second change in dimension. The first change in dimension is different from the second change in dimension by a predetermined threshold.

The details of one or more examples are set forth in the accompanying drawings and the description below. Other features, objects, and advantages will be apparent from the description and drawings, and from the claims.

BRIEF DESCRIPTION OF DRAWINGS

FIG. 2 is a conceptual diagram illustrating an example additively manufactured polymeric article including a higher polymer orientation region and a lower polymer orientation region.

FIG. 3A is a conceptual diagram illustrating an example additively manufactured polymeric article including trusses of high and low polymer orientation in an initial configuration.

FIG. 3B is a conceptual diagram illustrating a final configuration of the additively manufactured polymeric article of FIG. 3A in response to a shape change stimulus.

DETAILED DESCRIPTION

Figure 1:
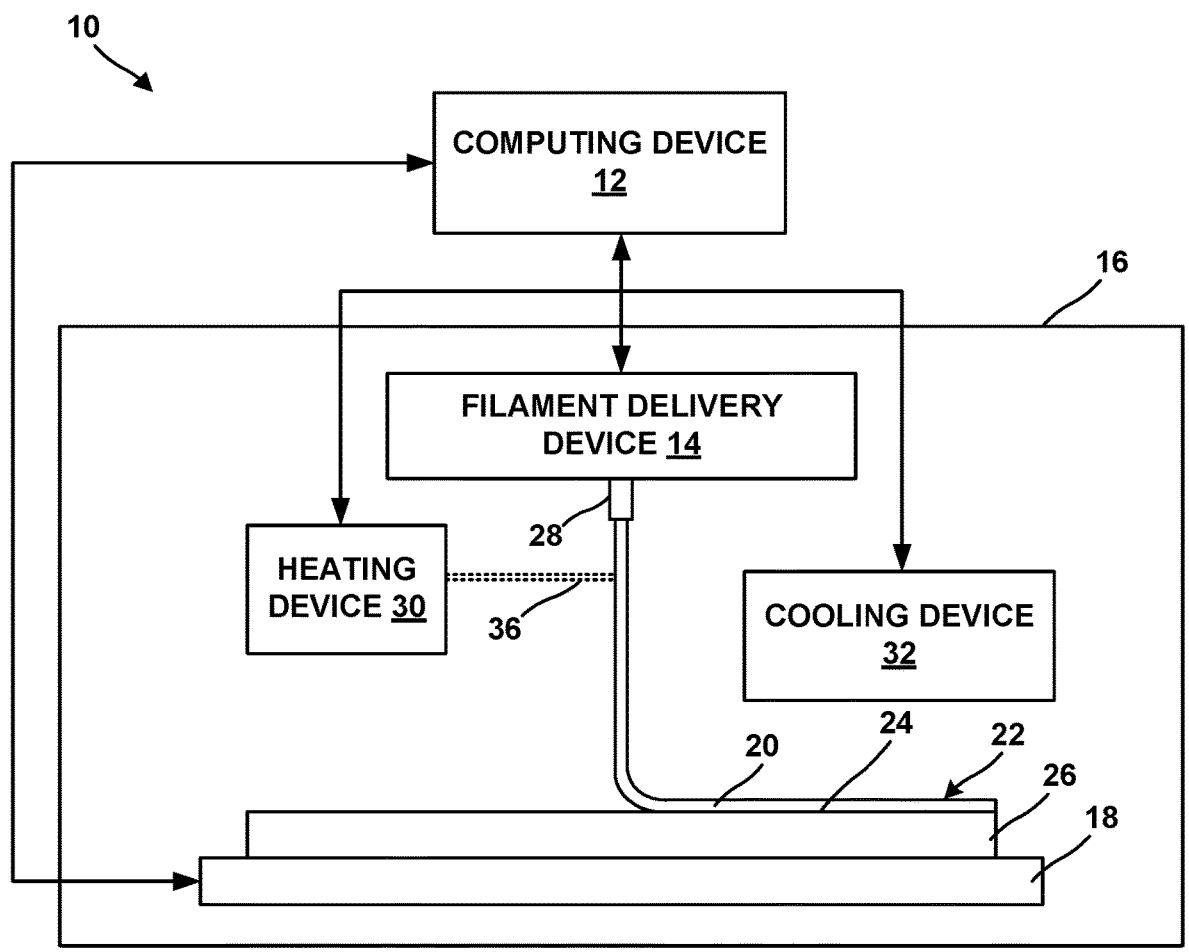
FIG. 1 is a conceptual diagram illustrating an example system for forming an additively manufactured polymeric component including regions of controlled degree of polymer orientation.

The disclosure generally describes techniques for forming additively manufactured components including at least one polymeric material having different polymer orientation regions.

Additive manufacturing techniques such as fused deposition modeling may include depositing heated, softened, or melted polymeric material along a series of predetermined path to ultimately form a component. The polymer material may exhibit polymer orientation to differing extents, depending on one or more of the temperature to which the material is heated, the rate at which the material is heated, the rate at which the material is cooled, the volumetric rate at which the material flows during deposition, or the extrusion or drawing force or pressure. Thus, upon solidification, different regions of a component formed from the same polymeric material may exhibit different degrees of polymer orientation (e.g., orientation of polymer chains, or crystallinities).

In some examples, the disclosure describes a technique that includes depositing, on or adjacent a substrate, a first volume of a polymeric material at a first deposition rate and a first temperature using an additive manufacturing technique for forming volumes of the polymeric material. The first volume of the polymeric material has a first degree of polymer orientation associated with the first deposition rate and the first temperature. The example technique may include depositing, on or adjacent the substrate or the first volume of material, at least one second volume of the polymeric material at a second deposition rate and a second temperature. The second volume of the polymeric material has a second degree of polymer orientation associated with the second deposition rate and the second temperature. In some examples, one or both of the deposition rates or temperatures may be different from each other. For example, the first deposition rate may be different from the second deposition rate and the first temperature may be different from the second temperature. In some examples, the first deposition rate is different from the second deposition rate, while the first temperature is substantially the same as the second temperature. In other examples, the first deposition rate is substantially the same as the second deposition rate, while the first temperature is different from the second temperature. The first volume and the second volume are configured to respond to a shape change stimulus by exhibiting a respective first change in dimension and a second change in dimension. The first change in dimension is different from the second change in dimension by a predetermined threshold.

The component may subsequently be exposed to a shape memory stimulus, for example, thermal exposure, which may cause a reduction in the degree of polymer orientation (e.g., relaxation of the polymer chains from a more linear orientation to a more random orientation), which may cause the polymeric material to shrink in at least one dimension, for example, a length along a major axis or along any other predetermined axis, or width, or any other suitable dimension. In some examples, the material may exhibit shrinkage in one or more dimensions to exhibit a shrinkage in a cross-sectional area or in volume. By controlling locations and orientations of volumes of polymeric material with respective degrees of polymer orientation, an additively manufactured component may be formed to exhibit one or more shape memory effects, for example, a change in dimension, volume, configuration, orientation, or shape, in response to a shape memory stimulus. Thus, example articles, systems, and techniques according to the disclosure may be used to form components including regions of degree of polymer orientation which may exhibit a shape change effect.

FIG. 1 is a conceptual block diagram illustrating an example additive manufacturing system 10 for forming an additively manufactured polymeric component including regions of controlled degree of polymer orientation. For example, additive manufacturing system 10 may be a fused deposition modelling or fused filament fabrication system.

Additive manufacturing system 10 includes computing device 12, filament delivery device 14, enclosure 16, and stage 18. Computing device 12 may include, for example, a desktop computer, a laptop computer, a workstation, a server, a mainframe, a cloud computing system, or the like. Computing device 12 is configured to control operation of additive manufacturing system 10, including, for example, filament delivery device 14, stage 18, or both. In some examples, computing device 12 may include control circuitry, such as one or more processors, including one or more microprocessors, digital signal processors (DSPs), application specific integrated circuits (ASICs), field programmable gate arrays (FPGAs), or any other equivalent integrated or discrete logic circuitry, as well as any combinations of such components. The term "processor" or "processing circuitry" may generally refer to any of the foregoing logic circuitry, alone or in combination with other logic circuitry, or any other equivalent circuitry. A control unit including hardware may also perform one or more of the techniques of this disclosure. Computing device 12 may be communicatively coupled to filament delivery device 14, stage 18, or both using respective communication connections. In some examples, the communication connections may include network links, such as Ethernet, ATM, or other network connections. Such connections may be wireless and/or wired connections. In other examples, the communication connections may include other types of device connections, such as USB, IEEE 1394, or the like.

Filament delivery device 14 may include a filament reel that holds wound filament including a composition. Filament delivery device 14 may advance the filament from the reel and heat the filament to above a softening or melting point of the composition. Material 20 in the heated, softened, or melted state is then extruded from a nozzle or a die 28 and laid down in a road 22 on a major surface 24 of a substrate 26 (or in subsequent layers, on a previously deposited road). In some examples, the nozzle or die 28 includes an extrusion nozzle or die, or a polymer draw die. For example, material may be forced out from nozzle or die 26 by a compressive or pushing pressure or force, or may be drawn out from nozzle or die 26 by a tensile or pulling force. Material 20 cools from the heated, softened, or melted state and, in this way, is joined to other roads. Substrate 26 may include a build plate on stage 18, or any suitable substrate defining a build surface. In some examples, system 10 may not include a separate substrate 26, and material 20 may be deposited on a build surface defined by stage 18, or on another component, or on layers of prior material 20 or another material. In some examples, the heated filament cools to form a portion of a volume of material deposited by filament delivery device 14.

In some examples, filament delivery device 14 may include, instead of the filament reel, a chamber that holds a volume of a composition. The composition may be flowable, extrudable, or drawable from filament delivery device 14, for example, from nozzle or die 28 of filament delivery device 14, in the form of material 20 that may be deposited on or adjacent stage 18 or substrate 26. Material 20 of the composition may be cured, cooled, or otherwise solidified to ultimately form an additively manufactured component.

The composition includes a polymeric material. The polymeric material may include polyolefins, polystyrene, acrylonitrile butadiene styrene, polylactic acid, thermoplastic polyurethanes, aliphatic polyamides, or the like, or combinations thereof. In some examples, the polymeric material includes a shape memory polymer. For example, the shape memory polymer may respond to a shape change stimulus, for example, thermal energy, electrical energy, photoenergy, or another suitable stimulus, to exhibit a change in a dimension, volume, shape, configuration, or orientation. In some examples, the polymeric material includes an electrically conductive composition. For example, the electrically conductive composition may include an intrinsically conductive polymer, or a polymer matrix including conductive particles, for example, metal or alloy particles, or particles having conductive surfaces.

The polymeric material may exhibit a degree of polymer orientation (e.g., a crystallinity) that may vary in response to a heating rate, a cooling rate, or mechanical stress (e.g., tensile stress) to which the polymeric material is subjected to. For example, a first volume of the polymeric material deposited by filament delivery device 14 at one or both of a first deposition rate or a first temperature may have a first degree of polymer orientation associated with the first deposition rate and the first temperature, while a second volume of the polymeric material deposited by filament delivery device 14 at one or both of a second deposition rate or a second temperature may have a second degree of polymer orientation associated with the second deposition rate and the second temperature. In some examples, one or both of the deposition rates or temperatures may be different from each other. For example, the first deposition rate may be different from the second deposition rate and the first temperature may be different from the second temperature. In some examples, the first deposition rate is different from the second deposition rate, while the first temperature is substantially the same as the second temperature. In other examples, the first deposition rate is substantially the same as the second deposition rate, while the first temperature is different from the second temperature.

The deposition rate or deposition temperature may affect stresses exerted on material 20 and strains exhibited by material 20 in response to the stresses during deposition (for example, extrusion), which may induce orientation in polymer chains in material 20. The deposition rate may also affect a cooling rate of material 20 as it leaves nozzle or die 28, for example, by affecting the dissipation of heat from material 20 to the ambient environment, or by affecting exposure of material 20 to a cooling stimulus. The cooling rate may affect the orientation of polymer chains in material 20. For example, a relatively high cooling rate may hold or arrest polymer chains in oriented configurations as material 20 cools, by reducing relaxation of the polymer chains. In contrast, a relatively low cooling rate may allow polymer chains to relax to a relatively greater extent, and reduce the degree of orientation. Thus, the deposition rate may ultimately affect the degree of orientation of polymer in material 20.

For example, a relatively high deposition (for example, extrusion) rate and a relative high cooling rate may result in a relatively higher degree of orientation. A relatively low extrusion rate and a relatively high cooling rate or a relatively high extrusion rate and a relatively low cooling rate may provide a medium degree of orientation. A relatively low extrusion rate and a relatively low cooling rate may result in a relatively low degree of orientation.

In some examples, in addition to, or instead of, a difference in deposition rate, a difference in deposition or extrusion temperature may influence the degree of orientation. In some examples, a relatively lower deposition extrusion temperature may result in a higher orientation The difference in degree of polymer orientation may influence the response of the polymeric material to shape change stimuli. For example, the first volume and the second volume may be configured to respond to a shape change stimulus by exhibiting a respective first change in dimension and a second change in dimension. The first change in dimension may be different from (for example, greater than or lesser than) the second change in dimension by a predetermined threshold. For example, the first change in dimension may be different from the second change in dimension by at least 10%, or by at least 20%, or at least 50%. Thus, an additively manufacture component including the polymeric material may define two regions, a region of relatively higher degree of polymer orientation and a region of relatively lower degree of polymer orientation, and the two regions may respond differently to shape change stimuli, resulting in a change of a configuration of the component as a whole to the shape change stimuli.

In some examples, additive manufacturing system 10 includes enclosure 16, which at least partially encloses filament delivery device 14, stage 18, and substrate 26. Enclosure 16 may provide physical protection to filament delivery device 14, stage 18, and substrate 26 during operation of additive manufacturing system 10, may maintain an atmosphere within enclosure 16 in a desired state (e.g., filled with an inert gas, under vacuum, or maintained at a desired temperature), or the like.

In some examples, stage 18 is movable relative to filament delivery device 14 and/or filament delivery device 14 is movable relative to stage 18. For example, stage 18 may be translatable and/or rotatable along at least one axis to position substrate 26 relative to filament delivery device 14. Similarly, filament delivery device 14 may be translatable and/or rotatable along at least one axis to position filament delivery device 14 relative to substrate 26. Stage 18 may be configured to selectively position and restrain substrate 26 in place relative to stage 18 during manufacturing of the additively manufactured component.

Computing device 12 may control movement and positioning of filament delivery device 14 relative to stage 18, and vice versa, to control the locations at which roads 22 are formed. Computing device 12 may control movement of filament delivery device 14, stage 18, or both, based on a computer aided manufacturing or computer aided design (CAM/CAD) file. For example, computing device 12 may control filament delivery device 14 to trace a pattern or shape to form a layer including a plurality of roads on surface 24. Computing device 12 may control filament delivery device 14 or stage 18 to move substrate 26 away from filament delivery device 14, then control filament delivery device 14 to trace a second pattern or shape to form a second layer including a plurality of roads on the first layer. Computing device 12 may control stage 18 and filament delivery device 14 in this manner to result in a plurality of layers, each layer including a traced shape or design. Together, the plurality of layers defines an additively manufactured component.

The additively manufactured component may define one or more channels or voids, for example, having any suitable cross-sectional shape, including rectangular, triangular, trapezoidal, curvilinear, or the like, or may include channels, pillars, plateaus, or other features.

In some examples, the additively manufactured component may define one or more trusses, struts, or support structures. While filament delivery device 14 may be used to deposit material 20 in roads or layers 22, in other examples, filament delivery device 14 may be used to extrude, or draw out, material 20 in any predetermined direction, with respective ends of successively extruded or drawn material 20 defining interconnected trusses, struts, or support structures. In some examples, system 10 may include a hand-held housing including filament delivery device 14, and a user or a robot may manipulate filament delivery device 14 with six degrees of freedom to cause material or filaments to be deposited, extruded, or drawn into trusses, struts, or support structures.

After one or more layers or support structures of the additively manufactured component are formed, or after the complete component is formed by additive manufacturing, the component may be subjected to further treatment, for example, subjecting to at least one shape change stimulus.

In some examples, system 10 includes one or both of a heating device 30 or a cooling device 32 to heat or cool the composition that forms material 20. For example, heating device 30 may include one or more of heating coils, thermal elements, forced air, radiative heat sources, or circulating heating fluids to heat the composition. In some examples, heating device 30 may be thermally coupled to nozzle or die 28, and material or filaments 20 may be heated before, during, or after exiting from filament delivery device 14, for example, via nozzle or die 28. In some examples, heating device 30 may be configured to deliver energy, for example, energy beam 36, to material 20. For example, directing energy beam 36 may augment heating of the polymeric material to a predetermined temperature. In some examples, heating device 30 includes an energy source, such as a laser source, an electron beam source, plasma source, or another source of energy that may be absorbed by the liquid photopolymer resin. Example laser sources include a CO laser, a $CO_2$ laser, a Nd:YAG laser, or the like. In some examples, the energy source may be selected to provide energy with a predetermined wavelength or wavelength spectrum that may be absorbed by the polymeric material, e.g., a wavelength or wavelength range in the ultraviolet wavelength spectrum.

In some examples, heating device 30 also includes an energy delivery head, which is operatively connected to the energy source. The energy delivery head may focus or direct the energy toward predetermined positions within filament delivery device 14 or adjacent substrate 26 or nozzle or die 28. As described above, in some examples, the energy delivery head may be movable in at least one dimension (e.g., translatable and/or rotatable) under control of computing device 12 to direct the energy toward a selected location within filament delivery device 14, or adjacent substrate 26 or nozzle or die 28.

Cooling device 32 may include cooling coils, forced cooling fluids, circulating fluids, passive cooling, cooling fins, or compressive cooling devices to cool the composition. In some examples, cooling device 32 may be thermally coupled to nozzle or die 28, and material or filaments 20 may be cooled before, during, or after exiting from filament delivery device 14, for example, via nozzle or die 28.

In some examples, system 10 may include both heating device 30 and cooling device 32, and the composition may be thermally treated in a predetermined thermal cycle including any suitable time and temperature treatment programs of heating or cooling, including ramping up, ramping down, holding patterns, or thermal cycling. Thus, computing device 12 may be configured to control one or both of heating device 30 or cooling device 32 to control a rate of heating or a rate of cooling of the polymeric material to control degree of orientation of the polymeric material in material or filaments 20, and in roads 22, or support structures formed from material or filaments 20.

Similar to filament delivery device 14, computing device 12 may be configured to control operation of one or more of stage 18, heating device 30, or cooling device 32, to position substrate 26 relative to heating device 30 or cooling device 32. For example, as described above, computing device 12 may control stage 18 and heating device 30 or cooling device 32 to translate and/or rotate along at least one axis to position substrate 26 relative to heating device 30 or cooling device 32. Positioning substrate 26 relative to heating device 30 or cooling device 32 may include positioning surface 24 (e.g., a surface to which material is to be added) of substrate 26 in a predetermined orientation relative to heating device 30 or cooling device 32.

In some examples, material 20 may be relatively hot (for example, above a glass transition temperature of polymeric material) to join to roads 22, and the cooling rate in combination with tensile stress in one road 22 in contact with other roads 22 may affect the eventual orientation, for example, maintaining high orientation created during deposition by preventing relaxation (for high orientation zones), or by allowing relaxation to reduce the orientation (for low orientation zones). Thus, system 10 may use heating device 30 and/or cooling device 32 to control the cooling rate of the material 20 at nozzle or die 28, or in in roads 22, to ultimately result the degree of orientation in one or more regions of the additively manufactured component.

FIG. 2 is a conceptual diagram illustrating an example additively manufactured polymeric article 40 including a region 42 of higher degree of polymer orientation and a region 44 of lower degree of polymer orientation. The composition or the identities of one or more polymeric materials in article 40 may be substantially the same in both regions 42 and 44. However, the degree of polymer orientation of regions 42 and 44 may differ depending on the rate at which regions 42 and 44 were deposited, the initial temperature from which material 20 or road 22 was cooled, the shear stress induced during extrusion, and the cooling rate at which material 20 or road 22 was cooled to form regions 42 and 44. For example, higher orientation region 42 may be formed by depositing, extruding, or drawing polymeric material at a relatively higher speed, relatively higher shear stress, or by cooling polymeric material at a relatively higher cooling rate, while lower orientation region 44 may be formed by depositing, extruding, or drawing polymeric material at a relatively lower speed, relatively low shear stress, or by cooling polymeric material at a relatively lower cooling rate. Without being bound by theory, deposition at a relatively higher rate may induce more stress, induce higher orientation in the direction of extrusion, result in a higher cooling rate, and provide lower time for molecules in the polymeric material to relax, and they may retain a higher orientation. Deposition at a relatively lower rate and with a lower cooling rate may allow molecules to relax, resulting in a lower orientation. In some examples, deposition at a relatively lower temperature may result in a higher orientation, while deposition at a relatively higher temperature may result in a lower orientation.

FIG. 3A is a conceptual diagram illustrating an example additively manufactured polymeric article including trusses of high and low polymer orientation 52 and 54 in an initial configuration 50a. High orientation trusses 52 may include one or more trusses (for example, 52a and 52b) having a polymeric material of a relatively higher orientation. Low orientation trusses 54 may include one or more trusses (for example, 54a, 54b, and 54b) having a polymeric material of a relatively lower orientation.

FIG. 3B is a conceptual diagram illustrating a final configuration 50b of the additively manufactured polymeric article of FIG. 3A in response to a shape change stimulus. The shape change stimulus may include a thermal, electrical, or any suitable shape change stimulus configured to induce a shape change in one or more regions of the polymeric article. For example, trusses 52 (for example, trusses 52a and 52b) may expand in response to the shape change stimulus, while trusses 54 (for example, trussed 54a, 54b, and 54b) may contract in response to the same shape change stimulus. Thus, the overall shape, configuration, or orientation of the polymeric article may change from configuration 50a of FIG. 3A to configuration 50b of FIG. 3B in response to the shape change stimulus. In some examples, both trusses 52 and 54 may contract, but to different extents. For example, trusses 54 may contract to a greater relative extent compared to trusses 52, to ultimately cause the polymeric article to change orientation, shape, or configuration.

An example technique that may be implemented by system 10 will be described with concurrent reference to FIG. 4.

Figure 4:
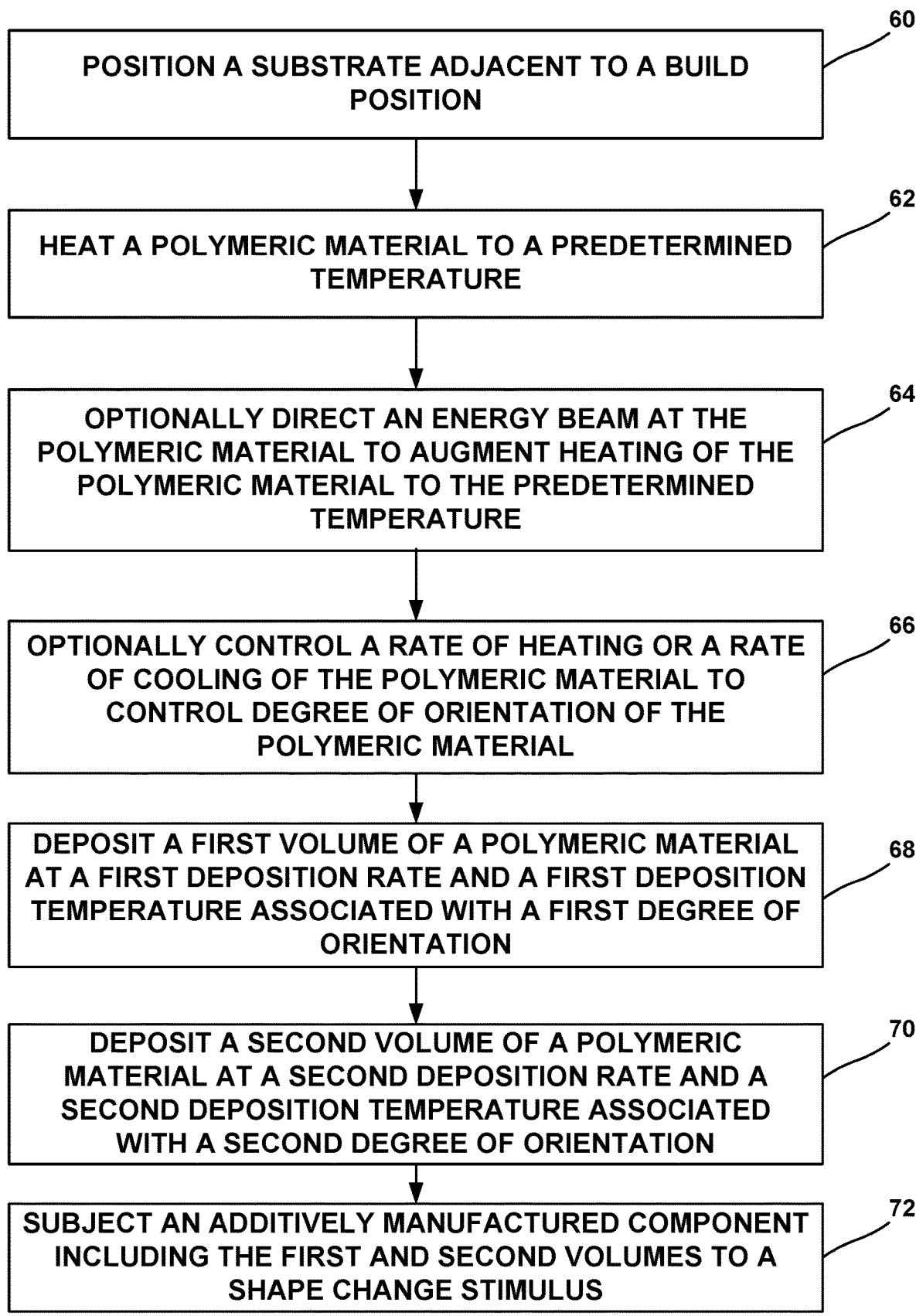
FIG. 4 is a flow diagram illustrating an example technique for forming an additively manufactured polymeric component including controlled polymer orientation regions.

FIG. 4 is a flow diagram illustrating an example technique for forming an additively manufactured polymeric component including controlled polymer orientation regions. Although the technique of FIG. 4 is described with respect to system 10 of FIG. 1, in other examples, the technique of FIG. 4 may be performed by other systems, for example, systems including fewer or more components than those illustrated in FIG. 1. Similarly, system 10 may be used to performed other additive manufacturing techniques.

The technique of FIG. 4 includes positioning substrate 26 including surface 24 adjacent to a build position, e.g., on stage 18 (60). The technique of FIG. 4 includes heating a polymeric material, for example, polymeric material to be extruded or drawn from filament delivery device 14, to a predetermined temperature (62). The heating (62) may including passing the polymeric material adjacent to or in thermal contact with one or both of heating device 30 or cooling device 32 to heat or cool the polymeric material to a predetermined temperature and at a predetermined rate. The technique of FIG. 4 may optionally include directing energy beam 36 from heating device 30 toward material 20, or road 22, or the polymeric material before, during, or after extrusion or drawing out from nozzle or die 28, to augment heating of the polymeric material to the predetermined temperature at the predetermined rate (64). The technique of FIG. 4 optionally includes, by computing device 12, controlling one or both of heating device 30 or cooling device 32 to control a rate of heating or a rate of cooling of the polymeric material to control a degree of orientation of the polymeric material (66).

The technique of FIG. 4 also includes depositing a first volume of the polymeric material at a first deposition rate and a first temperature associated with a first degree of orientation (68), and depositing a second volume of the polymeric material at a second deposition rate and a second temperature associated with a second degree of orientation (70). For example, the technique may include depositing, on or adjacent substrate 26, a first volume of a polymeric material at a first deposition rate and a first temperature (68). The first volume of the polymeric material has a first degree of orientation associated with the first deposition rate and the first temperature. The technique further includes depositing, on or adjacent substrate 26 or the first volume of material, at least one second volume of the polymeric material at a second deposition rate and a second temperature (70). The second volume of the polymeric material has a second degree of orientation associated with the second deposition rate and the second temperature. For example, a relatively high second deposition rate compared to the first deposition rate may result in the second degree of orientation being relatively higher than the first degree of orientation. A relatively low second deposition rate compared to the first deposition rate may result in the second degree of orientation being relatively lower than the first degree of orientation. In some examples, one or both of the deposition rates or temperatures may be different from each other. For example, the first deposition rate may be different from the second deposition rate and the first temperature may be different from the second temperature. In some examples, the first deposition rate is different from the second deposition rate, while the first temperature is substantially the same as the second temperature. In other examples, the first deposition rate is substantially the same as the second deposition rate, while the first temperature is different from the second temperature.

One or both of depositing the first volume (68) or depositing the second volume (70) may include extruding a heated filament or drawing a heated filament, for example, from nozzle or die 28. The first and second deposition rates may be volumetric flow rates, mass flow rates, extrusion speeds, or drawing speeds, or the like. For example, computing device 12 may control filament delivery device 14 to deposit material or filaments 20 in one or more roads or layers 22 including the first volume and the second volume to ultimately form the additively manufactured component. Thus, the technique may include fused deposition modeling, for example, as described with reference to system 10 of FIG. 1. The first volume and the second volume are configured to respond to a shape change stimulus by exhibiting a respective first change in dimension and a second change in dimension. The first and the second dimensions may be a length measured along a major axis, or along any other axis, or a width, or any other predetermined dimension. The first change in dimension is different from the second change in dimension by a predetermined threshold. For example, the difference may be at least about 10% by volume, or by at least 20% by volume, or by at least 30% by volume, or by at least 50% by volume.

In some examples, computing device 12 may control movement of filament delivery device 14, stage 18, or both, based on a computer aided manufacturing or computer aided design (CAM/CAD) file. In some examples, computing device 12 may control movement and positioning of filament delivery device 14 relative to stage 18, and vice versa, to control the locations and rates at which the first volume and the second volume are deposited in roads 22. For example, computing device 12 may control filament delivery device 14 to trace a pattern or shape to form a layer including a plurality of roads 2 on surface 24. Computing device 12 may control filament delivery device 14 or stage 18 to move substrate 26 away from filament delivery device 14, then control filament delivery device 14 to trace a second pattern or shape to form a second layer including a plurality of roads on the previously deposited layer. Computing device 12 may control stage 18 and filament delivery device 14 in this manner to result in the plurality of layers, each layer including a traced shape or design. Together, the plurality of layers defines an additively manufactured component including the first and the second volumes.

The technique of FIG. 4 includes, after forming the additively manufacturing component including depositing the first volume (68) and depositing the second volume (70), subjecting the component to a shape change stimulus (72). The subjecting (72) may include delivering thermal energy, electrical energy, or any suitable energy to induce a shape change in the component. For example, the first volume may exhibit a shape change effect different from a shape change effect exhibited by the second volume in response to substantially the same shape change stimulus. Such a difference in shape change effect may cause the component to exhibit an overall change in configuration, shape, or orientation.

Thus, the technique of FIG. 4 may be used to additively form a component exhibiting regions of different degree of orientation and different shape change effects.

The techniques described in this disclosure may be implemented, at least in part, in hardware, software, firmware, or any combination thereof. For example, various aspects of the described techniques may be implemented within one or more processors, including one or more microprocessors, digital signal processors (DSPs), application specific integrated circuits (ASICs), field programmable gate arrays (FPGAs), or any other equivalent integrated or discrete logic circuitry, as well as any combinations of such components. The term "processor" or "processing circuitry" may generally refer to any of the foregoing logic circuitry, alone or in combination with other logic circuitry, or any other equivalent circuitry. A control unit including hardware may also perform one or more of the techniques of this disclosure.

Such hardware, software, and firmware may be implemented within the same device or within separate devices to support the various techniques described in this disclosure. In addition, any of the described units, modules or components may be implemented together or separately as discrete but interoperable logic devices. Depiction of different features as modules or units is intended to highlight different functional aspects and does not necessarily imply that such modules or units must be realized by separate hardware, firmware, or software components. Rather, functionality associated with one or more modules or units may be performed by separate hardware, firmware, or software components, or integrated within common or separate hardware, firmware, or software components.

The techniques described in this disclosure may also be embodied or encoded in an article of manufacture including a computer-readable storage medium encoded with instructions. Instructions embedded or encoded in an article of manufacture including a computer-readable storage medium encoded, may cause one or more programmable processors, or other processors, to implement one or more of the techniques described herein, such as when instructions included or encoded in the computer-readable storage medium are executed by the one or more processors. Computer readable storage media may include random access memory (RAM), read only memory (ROM), programmable read only memory (PROM), erasable programmable read only memory (EPROM), electronically erasable programmable read only memory (EEPROM), flash memory, a hard disk, a compact disc ROM (CD-ROM), a floppy disk, a cassette, magnetic media, optical media, or other computer readable media. In some examples, an article of manufacture may include one or more computer-readable storage media.

In some examples, a computer-readable storage medium may include a non-transitory medium. The term "non-transitory" may indicate that the storage medium is not embodied in a carrier wave or a propagated signal. In certain examples, a non-transitory storage medium may store data that can, over time, change (e.g., in RAM or cache).

Clause 1: A method comprising: depositing, on or adjacent a substrate, a first volume of a polymeric material at a first deposition rate and a first temperature using an additive manufacturing technique for depositing volumes of the polymeric material, wherein the first volume of the polymeric material has a first degree of polymer orientation associated with the first deposition rate and the first temperature, and depositing, on or adjacent the substrate or the first volume of material, at least one second volume of the polymeric material at a second deposition rate and a second temperature, wherein the second volume of the polymeric material has a second degree of polymer orientation associated with the second deposition rate and the second temperature, wherein the first volume and the second volume are configured to respond to a shape change stimulus by exhibiting a respective first change in dimension and a second change in dimension, wherein the first change in dimension is different from the second change in dimension by a predetermined threshold.

Clause 2: The method of clause 1, wherein the additive manufacturing technique comprises fused deposition modeling.

Clause 3: The method of clause 1 or 2, wherein the additive manufacturing technique comprises outputting a heated filament comprising the polymeric material, wherein the heated filament cools to form the first volume of material and the at least one second volume of material.

Clause 4: The method of clause 3, further comprising extruding the heated filament.

Clause 5: The method of clause 3, further comprising drawing the heated filament.

Clause 6: The method of any of clauses 1 to 5, further comprising heating the polymeric material to a predetermined temperature within the filament delivery device or during deposition after exiting the filament delivery device, and, based on a predetermined deposition rate, cooling the polymeric material from the predetermined temperature at a predetermined cooling rate to control the degree of polymer orientation of the polymeric material.

Clause 7: The method of clause 6, wherein heating the polymeric material to the predetermined temperature comprises directing an energy beam at the polymeric material.

Clause 8: The method of any of clauses 1 to 7, further comprising, based on a predetermined deposition rate, controlling a heating device or a cooling device to control a heating rate or a cooling rate of the polymeric material to control the degree of polymer orientation of the polymeric material.

Clause 9: The method of any of clauses 1 to 8, wherein the polymeric material comprises a shape memory polymer.

Clause 10: The method of any of clauses 1 to 9, wherein the polymeric material comprises an electrically conductive composition.

Clause 11: The method of any of clauses 1 to 10, wherein depositing the first volume comprises controlling, by a computing device, means for additively depositing volumes to deposit the first volume at the first deposition rate and the first temperature, and wherein depositing the second volume comprises controlling, by the computing device, the means for additively depositing volumes to deposit the second volume at the second deposition rate and the second temperature.

Clause 12: An additive manufacturing system comprising: a substrate defining a major surface; means for additively depositing volumes of a material using an additive manufacturing technique; and a computing device configured to: control the means for additively depositing volumes to deposit on or adjacent the substrate a first volume of a polymeric material at a first deposition rate and a first temperature, wherein the first volume of the polymeric material has a first degree of polymer orientation associated with the first deposition rate and the first temperature, and control the means for additively depositing volumes to deposit, on or adjacent the substrate or the first volume of material, at least one second volume of the polymeric material at a second deposition rate and a second temperature, wherein the second volume of the polymeric material has a second degree of polymer orientation associated with the second deposition rate and the second temperature, wherein the first volume and the second volume are configured to respond to a shape change stimulus by exhibiting a respective first change in dimension and a second change in dimension, wherein the first change in dimension is different from than the second change in dimension by a predetermined threshold.

Clause 13: The system of clause 12, wherein the means for additively depositing volumes of material comprises: a fused deposition modeling device comprising a filament delivery device configured to output a heated filament comprising the polymeric material, wherein the heated filament cools to form the first volume of material and the at least one second volumes of material.

Clause 14: The system of clause 13, wherein the filament delivery device comprises an extrusion nozzle.

Clause 15: The system of clause 13, wherein the filament delivery device comprises a polymer draw die.

Clause 16: The system of any of clauses 12 to 15, wherein the filament delivery device comprises a heating device configured to heat the polymeric material to a predetermined temperature within the filament delivery device or during deposition after exiting the filament delivery device.

Clause 17: The system of clause 16, further comprising an energy source configured to direct an energy beam at the polymeric material to heat the polymeric material.

Clause 18: The system of any of clauses 12 to 17, wherein the polymeric material comprises a shape memory polymer.

Clause 19: The system of any of clauses 12 to 18, wherein the polymeric material comprises an electrically conductive composition.

Clause 20: The system of any of clauses 12 to 19, further comprising one or both of a heating device or a cooling device, and wherein the computing device is further configured to, based on a predetermined deposition rate, control one or both of the heating device or the cooling device to control a rate of heating or a rate of cooling of the polymeric material to control the degree of polymer orientation of the polymeric material.

Clause 21: A non-transitory computer-readable storage device comprising instructions that, when executed, cause one or more processors of a computing device to: control means for means for additively depositing volumes to deposit, on or adjacent a substrate, a first volume of a polymeric material at a first deposition rate and a first temperature using an additive manufacturing technique for forming volumes of the polymeric material, wherein the first volume of the polymeric material has a first degree of polymer orientation associated with the first deposition rate and the first temperature, and control the means for additively depositing volumes to deposit, on or adjacent the substrate or the first volume of material, at least one second volume of the polymeric material at a second deposition rate and a second temperature, wherein the second volume of the polymeric material has a second degree of polymer orientation associated with the second deposition rate and the second temperature, wherein the first volume and the second volume are configured to respond to a shape change stimulus by exhibiting a respective first change in dimension and a second change in dimension, wherein the first change in dimension is different from the second change in dimension by a predetermined threshold.

Various examples have been described. These and other examples are within the scope of the following claims.

What is claimed is:

1. A method comprising:
depositing, on or adjacent a substrate, a first volume of a polymeric material at a first deposition rate and a first temperature using an additive manufacturing technique for depositing volumes of the polymeric material, wherein the first volume of the polymeric material has a first degree of polymer orientation associated with the first deposition rate and the first temperature, and
depositing, on or adjacent the substrate or the first volume of material, at least one second volume of the polymeric material at a second deposition rate and a second temperature, wherein the second volume of the polymeric material has a second degree of polymer orientation associated with the second deposition rate and the second temperature, wherein the first volume and the second volume are configured to respond to a shape change stimulus by exhibiting a respective first change in dimension and a second change in dimension, wherein the first change in dimension is different from the second change in dimension by a predetermined threshold.

2. The method of claim 1, wherein the additive manufacturing technique comprises fused deposition modeling.

3. The method of claim 1, wherein the additive manufacturing technique comprises outputting a heated filament comprising the polymeric material, wherein the heated filament cools to form the first volume of material and the at least one second volume of material.

4. The method of claim 3, further comprising extruding the heated filament.

5. The method of claim 3, further comprising drawing the heated filament.

6. The method of any claim 1, further comprising heating the polymeric material to a predetermined temperature within the filament delivery device or during deposition after exiting the filament delivery device, and, based on a predetermined deposition rate, cooling the polymeric material from the predetermined temperature at a predetermined cooling rate to control the degree of polymer orientation of the polymeric material.

7. The method of claim 6, wherein heating the polymeric material to the predetermined temperature comprises directing an energy beam at the polymeric material.

8. The method of claim 1, further comprising, based on a predetermined deposition rate, controlling a heating device or a cooling device to control a heating rate or a cooling rate of the polymeric material to control the degree of polymer orientation of the polymeric material.

9. The method of claim 1, wherein the polymeric material comprises a shape memory polymer.

10. The method of claim 1, wherein the polymeric material comprises an electrically conductive composition.

11. The method of claim 1, wherein depositing the first volume comprises controlling, by a computing device, means for additively depositing volumes to deposit the first volume at the first deposition rate and the first temperature, and wherein depositing the second volume comprises controlling, by the computing device, the means for additively depositing volumes to deposit the second volume at the second deposition rate and the second temperature.

* * * * *